United States Patent
Clouse et al.

(10) Patent No.: US 11,262,141 B2
(45) Date of Patent: Mar. 1, 2022

(54) REMOTE RADIATOR FOR A GENERATOR SYSTEM

(71) Applicant: Kohler Co., Kohler, WI (US)

(72) Inventors: Adam Clouse, Howards Grove, WI (US); Bradley L. Meissner, Fredonia, WI (US); Zachary J. Schreiner, Manitowoc, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/183,088

(22) Filed: Feb. 23, 2021

(65) Prior Publication Data

US 2021/0172688 A1  Jun. 10, 2021

Related U.S. Application Data

(62) Division of application No. 15/865,327, filed on Jan. 9, 2018, now Pat. No. 10,962,310.
(Continued)

(51) Int. Cl.
*H02K 15/00* (2006.01)
*F28F 9/02* (2006.01)
(Continued)

(52) U.S. Cl.
CPC ............ *F28F 9/0268* (2013.01); *F01P 3/20* (2013.01); *F02B 63/00* (2013.01); *F02B 63/044* (2013.01);
(Continued)

(58) Field of Classification Search
CPC .. F28F 9/007; F28F 9/0268; F01P 1/06; F01P 2001/005; F01P 3/20; F01P 11/029;
(Continued)

(56) References Cited

U.S. PATENT DOCUMENTS

| 4,136,432 A | 1/1979 | Melley, Jr. |
| 4,951,871 A | 8/1990 | Hata et al. |

(Continued)

FOREIGN PATENT DOCUMENTS

JP   H08021241   1/1996

OTHER PUBLICATIONS

Generator Set Cooling Systems, MacAllister Machinery Co., Inc; http://www.macallisterpowersystems.com/solutions/engineering-toolbox/generator-set-cooling-systems/; Publication Date: Oct. 15, 2012.
(Continued)

*Primary Examiner* — Jacob R Crum
(74) *Attorney, Agent, or Firm* — Lempia Summerfield Katz LLC (57) ABSTRACT

A generator structure includes a lower compartment, an upper compartment, and an intake duct. The lower compartment is configured to support and house at least an alternator and an engine. The upper compartment configured to support and house and at least one cooling device configured to cool the lower compartment. The upper compartment and the lower compartment are vertically arranged. The intake duct is integrated with the lower compartment and includes an upper pathway duct and a lower pathway duct. The upper pathway duct provides a path of air to at least an intake of the engine and the lower pathway ducts provides a path of air to at least cool the alternator.

10 Claims, 11 Drawing Sheets

Related U.S. Application Data (60) Provisional application No. 62/445,559, filed on Jan. 12, 2017.

(51) Int. Cl.

| | | |
|---|---|---|
| *F28F 9/007* | (2006.01) | |
| *H02K 5/20* | (2006.01) | |
| *H02K 9/06* | (2006.01) | |
| *F02B 63/04* | (2006.01) | |
| *F01P 3/20* | (2006.01) | |
| *F02B 63/00* | (2006.01) | |
| *F01P 1/00* | (2006.01) | |
| *F01P 11/02* | (2006.01) | |
| *F01P 1/06* | (2006.01) | |

(52) U.S. Cl.
CPC ............... *F28F 9/007* (2013.01); *H02K 5/20* (2013.01); *H02K 9/06* (2013.01); *H02K 15/00* (2013.01); *F01P 1/06* (2013.01); *F01P 11/029* (2013.01); *F01P 2001/005* (2013.01)

(58) Field of Classification Search
CPC ......... F02B 63/00; F02B 63/044; H02K 5/20; H02K 9/00; H02K 9/06; H02K 15/00
See application file for complete search history.

(56) References Cited

U.S. PATENT DOCUMENTS

| | | |
|---|---|---|
| 5,433,175 A | 7/1995 | Hughes et al. |
| 5,515,816 A | 5/1996 | Ball et al. |
| 5,624,589 A | 4/1997 | Latvis et al. |
| 5,899,174 A | 5/1999 | Anderson et al. |
| 6,376,944 B1 | 4/2002 | Grizzle, Jr. et al. |
| 8,360,014 B2 | 1/2013 | Ono et al. |
| 8,963,348 B2 | 2/2015 | Kawakita et al. |
| 2007/0132243 A1 | 6/2007 | Wurtele et al. |
| 2008/0023962 A1* | 1/2008 | Cho .............. F25B 27/02 290/2 |
| 2011/0056453 A1 | 3/2011 | Ono et al. |
| 2011/0115235 A1 | 5/2011 | Steffl |
| 2011/0303482 A1 | 12/2011 | Niwa et al. |
| 2012/0146465 A1 | 6/2012 | Kawakita et al. |
| 2013/0113219 A1 | 5/2013 | Honkanen et al. |
| 2013/0147203 A1 | 6/2013 | Gillett et al. |
| 2016/0090893 A1 | 3/2016 | Ikeda et al. |
| 2016/0233739 A1 | 8/2016 | Jenison et al. |
| 2017/0314451 A1 | 11/2017 | Jochman |
| 2018/0023808 A1* | 1/2018 | Reiff .............. F23J 13/04 126/312 |
| 2018/0038351 A1* | 2/2018 | Jacobsen .......... F03D 80/60 |

OTHER PUBLICATIONS

Remote Radiatior Systems for Generator Sets, Clifford Power Systems, Inc.; Information Sheet #20; 2014; 2 pages.

\* cited by examiner

REMOTE RADIATOR FOR A GENERATOR SYSTEM

CROSS REFERENCE TO RELATED PATENT APPLICATIONS

This application is a divisional application under 37 C.F.R. § 1.53(b) and 35 U.S.C. § 121 of U.S. patent application Ser. No. 15/865,327, filed Jan. 9, 2018, which claims the benefit of U.S. Provisional Application No. 62/445,559, filed Jan. 12, 2017, the entire disclosures of which are incorporated by reference in their entirety.

TECHNICAL FIELD

This disclosure relates in general to a remote radiator for a generator system, or more particularly, a radiator cooling system vertically disposed and separated from an engine and alternator of a generator system.

BACKGROUND

Generators are used in a variety of applications to provide electrical power when power from a power grid is unavailable or not desired. Generators may be used in both commercial and residential settings. In both instances, the generator may be placed outside, adjacent to a building structure or other structure requiring electrical power. In certain instances, the available area to place the generator system may be limited or it may be desired to limit square footage when utilized for a generator system.

BRIEF DESCRIPTION OF THE DRAWINGS

Exemplary embodiments are described herein with reference to the following drawings.

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
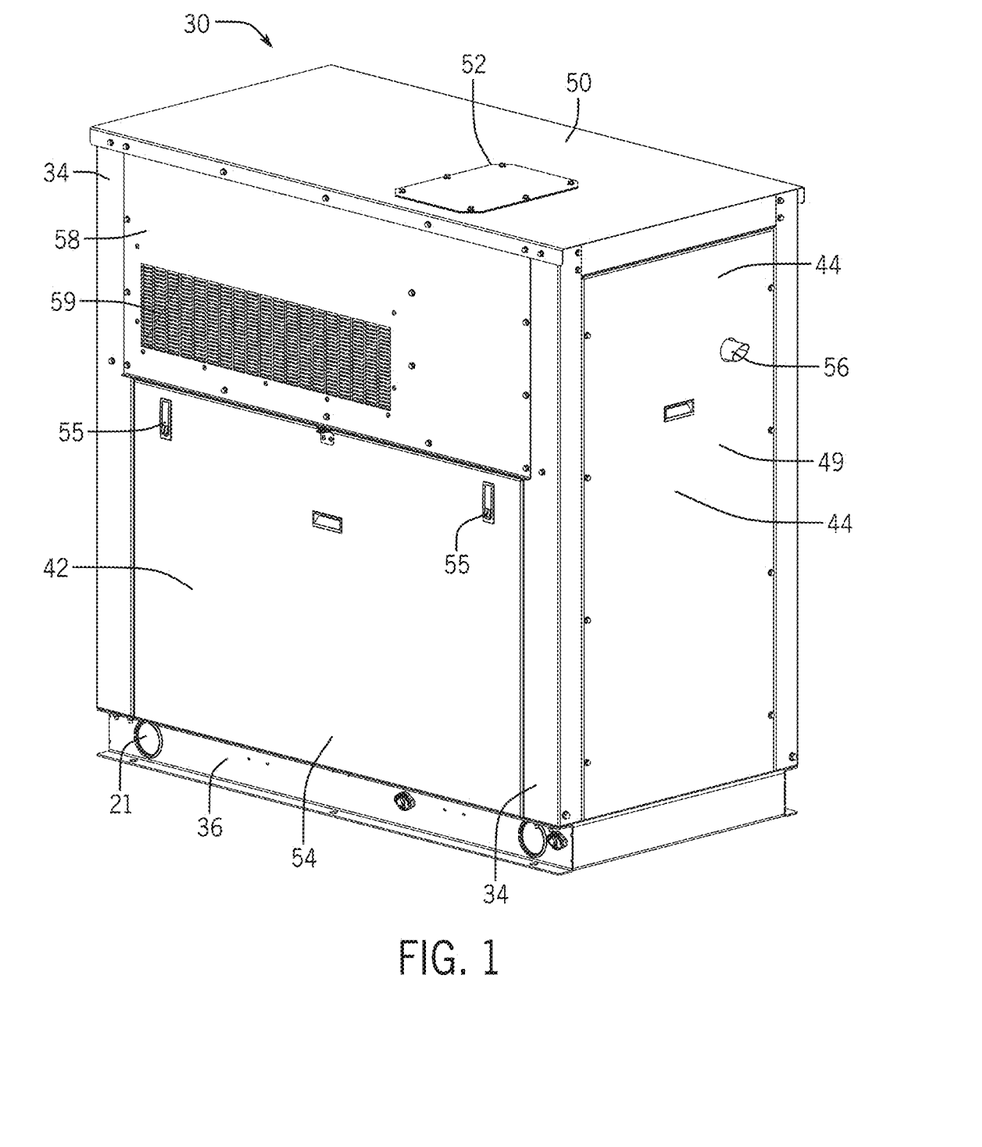
FIG. 1 illustrates a front perspective view of an example generator system.

FIG. 1 illustrates a perspective view of an example generator system 30. The generator system depicted in FIG. 1 includes a front 42, a first side 44, a rear 46, a second side 48, and a top 50. The top 50 of the generator system may include an access panel 52 sized smaller than the top 50. The access panel 52 may provide access to a radiator system and/or a coolant tank 22 and cap (illustrated in more detail with respect to FIG. 3). The generator system 30 generally includes a generator enclosure and internal components. The generator enclosure includes four corner posts 34, one located at each corner of the generator system 30. The corner posts 34 are extruded L-shaped elements or bent sheet metal that are rigid and support the enclosure of the generator system 30. The adjacent corner posts 34 are connected together with a skid 36. The skid 36 is physically mounted to the corner posts 34 for supporting the generator system 30. The skid 36, or base support member, may have the same footprint (e.g., dimensions of length and width) as the generator system 30. The skid 36 may include one or more holes 21 (illustrated with caps). The holes 31 allow the generator system to be lifted or otherwise moved (e.g., independently of a fuel tank).

In one alternative example, cross-members support the generator system 30. There may be a cross-member on each of the front 42, first side 44, rear 46, and second side 48. The cross-members 36 are attached to the base of the corner elements 34 with a fastener. The cross-members 36 are elongated elements that support the generator system 30.

The front 42 of the generator system 30 includes a front access panel 54. The front access panel 54 spans the width of the front 42 from one corner post 34 to another corner post 34. The front access panel 54 extends vertically from the cross-member 36 substantially up to the top 50. The front access panel 54 is removably attached to the generator system 30 with latches 55 or another selective coupling device. Removing the front access panel 54 allows an operator to gain access to the internal components located at the front 42 of the generator system 30.

Also located on the front 42 is a radiator air intake panel 58. The radiator air intake panel 58 extends across the width of the front 42 from one corner post 34 to another corner post 34. The radiator air intake panel 58 extends vertically from the top of the front access panel 54 to the top 50 of the generator system 30. An intake grate 59 is formed in a middle section of the radiator air intake panel 58.

The first side 44 of the generator system 30 as depicted in FIG. 1 includes a first side panel 49 that extends from the base of the generator system 30 to the top 50. The first side panel 49 may be removable and server as an access panel. Alternatively, a separate access panel, smaller than the first side panel 49 may be located on the first side panel 49. The access panel fastens to the first side panel 49 with screws or another fastener. The access panel covers an opening in the first side panel 49. The first side panel 49 also includes a smaller opening through with an exhaust pipe 56 of the generator system 30 may extend through.

Figure 2:
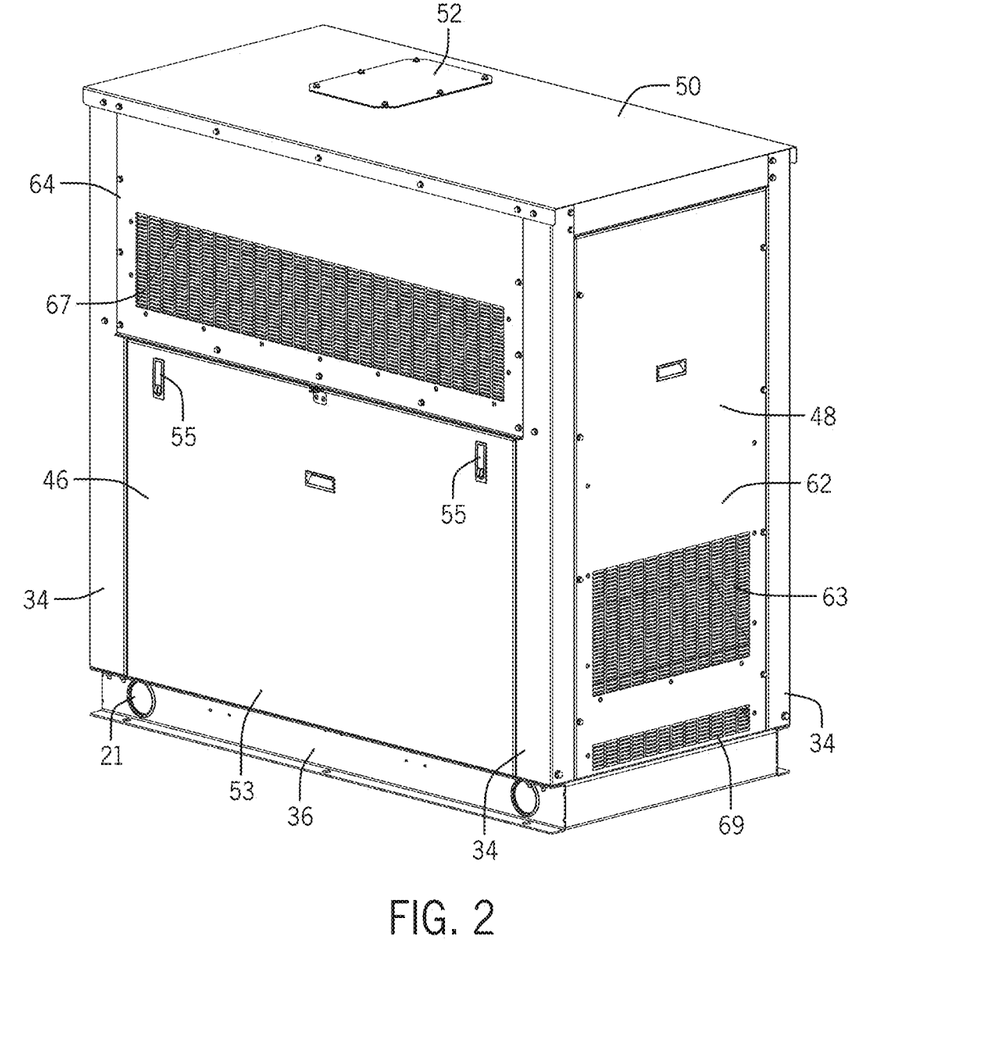
FIG. 2 illustrates a rear perspective view of a generator system as depicted in FIG. 1.

FIG. 2 depicts a rear view of the generator system 30 of FIG. 1. The rear 46 of the generator system 30 includes a rear access panel 53. The rear access panel 53 spans the width of the front 42 from one corner post 34 to the other corner post 34. The rear access panel 53 extends vertically from the skid 36 substantially up to the top 50. The rear access panel 53 is removably attached to the generator system 30 with latches 55. Removing the rear access panel 53 allows an operator to gain access to the internal components located at the rear 46 of the generator system 30.

Located on the rear 46 above the rear access panel 53 is an exhaust panel 64. The exhaust panel 64 extends across the width of the front 42 from one corner post 34 to the other corner post 34. The exhaust panel 64 extends vertically from the top of the rear access panel 53 to the top 50 of the generator system 30. An exhaust grate may be formed in a middle section of the exhaust panel 64.

Also depicted in FIG. 2 is the second side 48 of the generator system 30. The second side 48 includes a ventilation intake panel 62, which may be referred to as a side panel. The ventilation intake panel 62 spans the width of the second side 48 from one corner post 34 to the other corner post 34. The ventilation intake panel 62 may extend vertically from the bottom of the generator system 30 substantially up to the top 50. The ventilation intake panel 62 may be fastened to the corner posts 34 with screws.

The ventilation intake panel 62 includes a lower air intake 69. The lower air intake 69 may be a grate formed in ventilation intake panel 62 to allow air to flow through the ventilation intake panel 62 to cool the alternator.

Located above the lower air intake 69 is an upper air intake 63. The upper air intake 63 may be a grate formed in the ventilation intake panel 62 to allow air to flow through the ventilation intake panel 62 for engine 66 cooling and combustion. The upper air intake 63 and lower air intake 69 are configured to mate with an intake duct 70 located inside the generator system 30.

In one alternative, the ventilation panel 62 may be divided into a side panel at the lower part of the generator system 30 and a cover panel at the upper part of the generator system 30. The cover panel may span from one corner post 34 to the other corner post 34 and from the ventilation intake panel 62 to the top 50.

Depicted in both FIGS. 1 and 2 is the top 50 of the generator system 30. The top panel 50 is configured to extend from the rear 46 to the front 42, and from the first side 44 to the second side 48. The top panel 50 may be flat panel or a dome-like configuration. The top panel 50 is sized to cover the top of the generator system 30 to protect the generator system 30 from weather elements.

Figure 3:
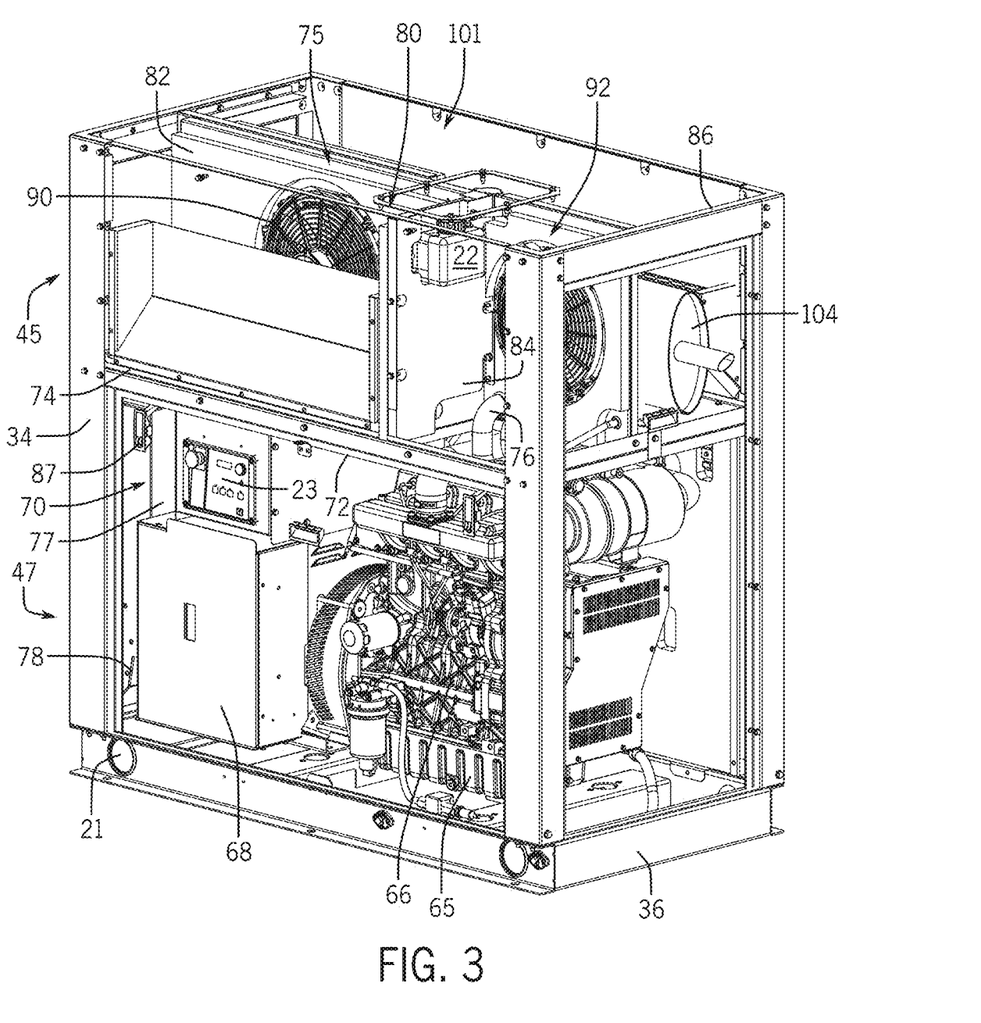
FIG. 3 illustrates a perspective of internal elements of FIG. 1.

Referring to FIG. 3, the generator system 30 depicted includes two separate compartments, an upper compartment 45 and a lower compartment 47. The two compartments are separated by a channeling panel 74, which divides the internal portion of the generator system 30 into the two separate compartments. The upper compartment 45 may also be referred to as a plenum, meaning a separate space from an engine 66 and an alternator 68 provided for air circulation of the generator system, and the upper compartment 45 is defined by a channeling panel 74 on the bottom, the front 42, the first and second sides 44, 48, the rear 46, and the top 50. The lower compartment 47, which includes the engine 66 and the alternator 68, is defined by the channeling panel 74 on the top, the front 42, the first and second sides 44, 48, the rear 46, and the base 65. The lower compartment 47 may also include electric controls 23 for controlling the engine 66 and/or the alternator. The upper compartment 45 and the lower compartment 47 are vertically arranged. In one example, the horizontal cross sectional area of the upper compartment 45 is substantially aligned with the horizontal cross sectional area of the lower compartment.

The electric controls 23 may include user input mechanisms, a control circuit, a controller, and one or more power components. The user input mechanisms may include a key pad, a touch screen, or a shutoff switch. The key pad or the touch pad may receive user input codes for settings of the generator system. The setting may specify engine speed, generator outputs, or operation profiles. The operation profiles may control one or more fans of the generator system 30 to control air flow through the generator system 30. That is, the operation profile may include a timing control for one or more fans of the generator system 30. The shutoff switch may turn off the throttle of the generator system 30 to turn off the generator system.

The controller may receive user commands and calculate a generator command for operation of the engine 66 and/or the generator 68. The generator command may instruct the engine 66 to a specified speed or torque. The generator command may instruct the alternator 68 to a specific frequency or load. The generator command may be sent to an external system controller or another generator controller.

The channeling panel 74 is a planar panel internal to the generator system 30. The channeling panel 74 extends from the front 42 to the rear 46 and from the first side 44 to the second side 48. The channeling panel 74 creates a water barrier between the upper compartment 45 and the lower compartment 47. The channeling panel 74 separates the remote radiator system from the engine 66 and alternator 68 of the generator system 30.

The channeling panel 74 may include an air flow opening 76 between the upper compartment 45 and lower compartment 47. The air flow opening 76 is configured such that water does not enter the lower compartment 47 through the opening 76. The water barrier function of the channeling panel is more fully described below.

The channeling panel 74 may be a planar panel. The channeling panel 74 may be sloped from the front 42 to the rear 46 or the channeling panel 74 may be substantially horizontal or level. The term substantially horizontal may be defined as perpendicular to the direction of gravity or within a predetermined angle of the direction of gravity (e.g., within 1 degree). The channeling panel 74 may be sloped in another direction. The channeling panel 74 may be sloped to direct water that collects within the upper compartment 45 to the rear 46 of the generator system 30 where it may be directed out of the upper compartment 45. Water that is directed down the slope of the channeling panel is directed to drainage holes.

In one example, drainage holes may be located as through holes in the exhaust panel 64, integrated into the channeling panel 74, or be directed through an exhaust grate. The water flows through the holes outside of the generator system 30 and down the sides.

The upper compartment 45 includes a remote radiator system 80 for the engine 66. The remote radiator system 80 includes a cross-panel 82. The cross-panel 82 extends from the first side 44 to the second side 48 within the upper compartment 45. The cross-panel 82 includes an opening or grate area in the middle to allow air to pass through the cross-panel 84.

Attached to the cross-panel 82 are one or more section panels 84 that extend from the cross-panel 82 to radiator intake panel 58. The section panels 84 contact the radiator intake panel 58 on each side of the grate 59, forming a cavity 75. A radiator fan 90 is mounted within the cavity. The radiator fan 90 is configured to draw air from outside the generator system 30 in through the lower air intake 69 and into the cavity 75.

Figure 5:
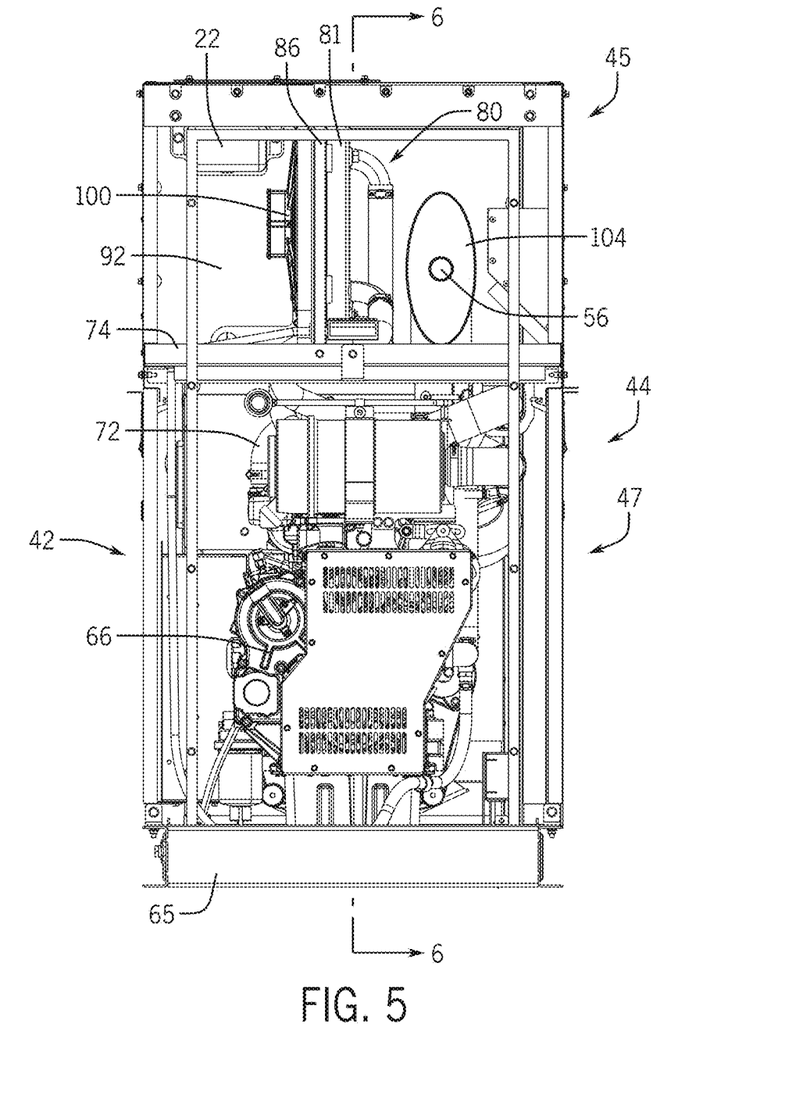
FIG. 5 illustrates a first side view of the generator system.

A remote radiator 81, as illustrated in FIG. 5, is connected to the cross-panel 82 on a side opposite the cavity 75. The radiator 81 may be a standard radiator used to exchange heat from the engine 66 to the atmosphere through a cooling fluid, thereby regulating the engine temperature. The remote radiator 81 may include an upper tank 22 for storing the cooling fluid, or a portion (e.g., excess) of the cooling fluid. The upper tank 22 may include an inlet. The inlet may be connected to the cooling fluid outlet of the engine 66 through an outlet hose and accepts the heated cooling fluid from the engine 66. Alternatively, the radiator 81 may also include tanks on the side of the radiator 81.

The remote radiator 81 may include a core, where air flow passes through the core and cools the cooling fluid. The remote radiator 81 may also include a bottom tank. The bottom tank may include an outlet. The outlet may be connected to the cooling fluid inlet of the engine 66 through an inlet hose. The cooled fluid passes from the remote radiator 81, exiting through the outlet and traveling through the inlet hose to the engine. Both the inlet hose and outlet hose will be an extended length in order to connect the remote radiator 81 to the engine 66.

The remote radiator system 80 may also include a catch basin below the remote radiator 81. The catch basin may be located directly under the remote radiator to collect any fluids, cooling or otherwise, that leak from the radiator and direct them away, thereby preventing fluid from entering the lower compartment. 47.

The upper compartment 45 also includes an exhaust duct cavity 92 containing an exhaust fan 100. The exhaust duct cavity 92 is the area defined by the radiator intake panel 58, the first side panel 49, the cross-panel 82, and the adjacent section panel 84. The channeling panel 74 includes an opening or cutout 76 in the area defined by the exhaust duct cavity 92. The opening 76 creates an air flow path from the lower compartment 47 into the exhaust duct cavity 92 of the upper compartment 45. The connection between the cross-panel 82 and the adjacent section panel 84 are made water tight or otherwise sealed to prevent water from leaking into the lower compartment 47 at the exhaust duct cavity 92.

Mounted within the cross-panel 82 portion of the exhaust duct cavity is the exhaust fan 100. The exhaust fan 100 will be further described below in connection with FIGS. 4, 7, and 8. The muffler 104 is also found within the upper compartment 45 depicted in FIG. 3. The muffler is further described below in connection with FIG. 5.

As illustrated in FIG. 3, the lower compartment 47 includes the engine 66. The engine is mounted to the base 65 to secure it within the generator system 30. The engine 66 may be an internal combustion engine. The engine 66 may include external components such as crankshaft, flywheel, muffler 104, air cleaning system, and a control portion. The engine 66 may be a two-stroke engine or a four-stroke engine. The number of cylinders of the engine 66 may vary to include one cylinder or multiple cylinders. The size of the engine 66 may vary depending on the application.

The engine 66 may be any type of engine in which the combustion of a fuel (e.g., gasoline or another liquid fuel) with an oxidizer (e.g., air) in a chamber applies a force to a drive component (e.g., piston, turbine, or another component) of the engine 66. The drive component rotates to turn a drive shaft. The drive shaft of the engine 66 may be connected to an alternator 68.

The alternator 68 is operated by rotation of the drive shaft to turn the alternator 68 and produce electric output. The alternator 68 includes an alternator fan 71. The alternator fan 71 functions to draw air over the alternator 68 to cool the alternator 68.

Also located in the lower compartment 47 is the intake duct 70. The intake duct 70 includes two sections, an upper duct 77 and a lower duct 78. The intake duct 70 will be described further in relation to FIG. 6 below.

Figure 4:
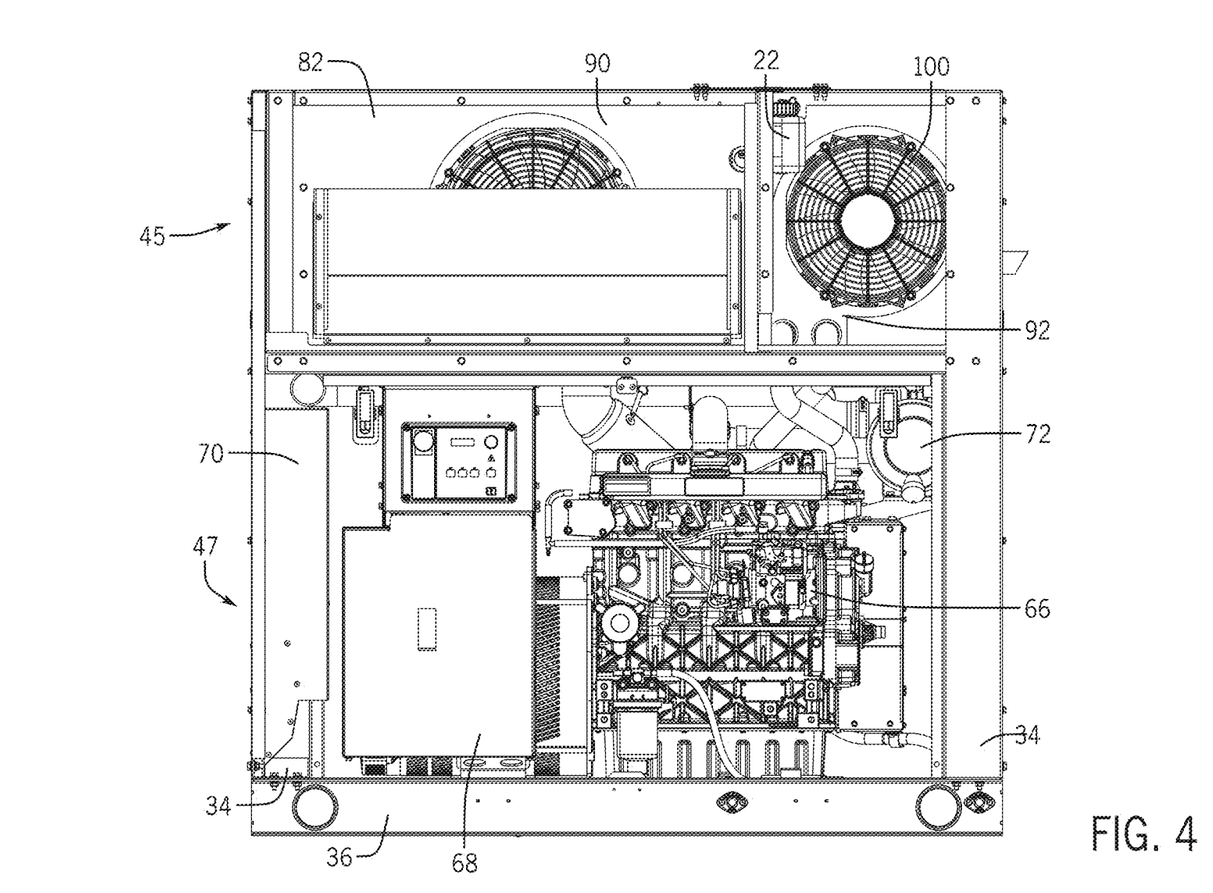
FIG. 4 illustrates a front view of the generator system.

FIG. 4 illustrates a front view of the perspective of FIG. 3. Shown in FIG. 4 is the exhaust fan 100 discussed above. The exhaust fan 100 is mounted within the cross-panel 82. The exhaust fan 100 functions to draw air from the lower compartment 47 into the exhaust duct cavity 92. The function of the exhaust fan 100 is described below in connection with the function of the generator system 30.

FIG. 5 illustrates a first side 44 of the generator system 30. In FIG. 5, the upper compartment 45 and lower compartment 47 is shown. The channeling panel 74 is depicted as dividing the upper compartment 45 and lower compartment 47. The channeling panel 74 may also be referred to as a divider or separating element As can be observed in FIG. 5, the channeling panel 74 may be substantially horizontal, but alternatively may include the slope as discussed above. The channeling panel 74 on the side adjacent the front 42 is vertically higher than the side adjacent the rear 46 of the generator system 30. The slope of the channeling panel may be in the range of $\frac{1}{16}$ of an inch per foot to 1 inch per foot. Alternatively, the channeling panel may be orientated at an angle in the range of 5 to 25 degrees from the drainage point.

The channeling panel 74 may also be sloped in any direction within the generator system, so long as a flow path for water is created to direct water out of the upper compartment 45 and out of the generator system 30.

Also illustrated in FIG. 5 in the upper compartment 45 is the remote radiator system 80, including the remote radiator fan 90 and radiator 81. As illustrated in FIG. 5, the radiator fan 81 is connected to the fan support panel 86 on one side. The opposite side of the fan support panel 86 includes the remote radiator 81 connected thereto.

The muffler 104 located in the upper compartment 45 is also depicted in FIG. 5. The muffler 104 may be physically connected to the channeling panel 74 directly through a rivet, bolt, or another connector. The muffler 104 may alternatively be connected to upper compartment 45 via a mounting bracket. The mounting brackets may connect to a mounting bar that is attached to the first side 44 and second side 48 of the generator system 30.

Figure 6:
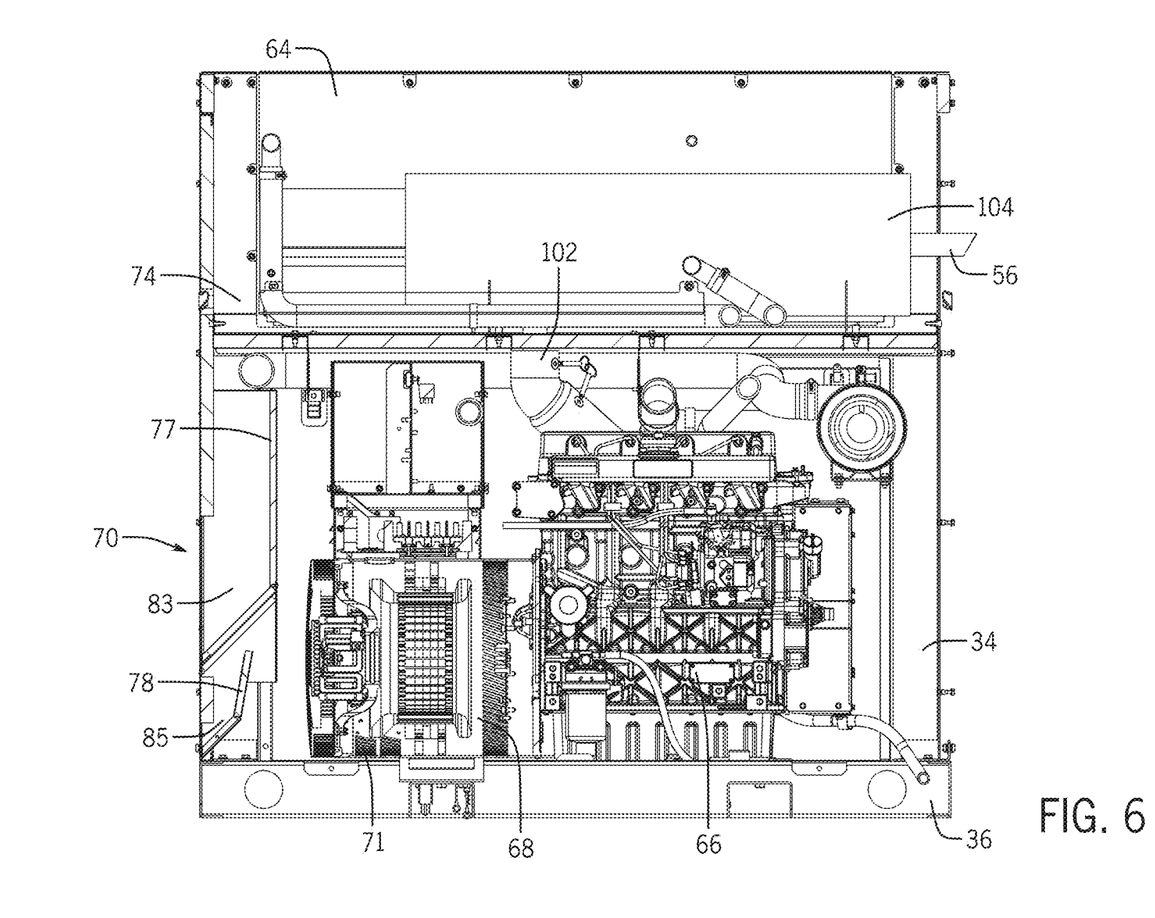
FIG. 6 illustrates a view from the back of the generator system as depicted in FIG. 3.

As illustrated in FIG. 6, the muffler 104 is connected to the engine 66 via an exhaust pipe 102. The exhaust pipe 102 extends from the muffler 104 in the upper compartment 45 down into the lower compartment 47 and is connected to the engine 66. The exhaust pipe 102 passes through the channeling panel 74 through an opening in the channeling panel. A water tight seal may be maintained between the exhaust pipe 102 and channeling panel 74. This water tight seal may be created to prevent water in the upper compartment 45 from draining into the lower compartment 47. Alternatively, the channeling panel may be formed with a raised-lip around the opening to prevent water from reaching the opening and flowing into the lower compartment 47.

FIG. 6 illustrates a view from the front 42 of the generator system 30 with a cut-away of the intake duct 70. The intake duct 70 includes an upper duct 77 and a lower duct 78. Located within the upper duct is upper channel 83. The lower duct 85 includes a lower channel 85.

The upper duct 77 is in communication with the upper air intake 63 depicted in FIG. 2. The upper duct 77 is attached to the ventilation intake panel 62 just below the upper air intake 63. The upper duct 77 extends vertically at an angle away from the ventilation intake panel 62. Sides 87 are connected to the vertical edges of the upper duct 77. The sides 87 extend from the upper duct 77 to the ventilation intake panel 62. The top of the upper duct 77 is open to the lower compartment 47. The upper duct 77 and sides 87 enclose the upper duct 77 about the ventilation intake panel 62, creating the upper channel 83 between the ventilation intake panel 62 and the upper duct 77.

The upper duct 77 and upper channel 83 provide the main source of cooling airflow for the lower compartment 47 and combustion for the engine 66. The upper duct 77 may also provide cooling of the electric controls 23 located adjacent the opening of upper duct 77 inside of the lower compartment 47. The electric controls may include circuits, controllers, capacitors, breakers, or other components that generate heat. The upper channel 83 is further configured to provide the proper amount of air volume to supply the engine with sufficient air for combustion and operation of the engine 66.

Illustrated in FIG. 6, the lower duct 78 is in communication with the lower air intake 69 depicted in FIG. 2. The lower duct 78 is attached to the ventilation intake panel 62 just below the lower air intake 69. The lower duct 78 extends vertically at an angle away from the ventilation intake panel 62. The sides 87 connected to the upper duct 77 extend down to the base and are additionally connected to the lower duct 78. The sides 87 extend from the lower duct 78 to the ventilation intake panel 62. The top of the lower duct 78 is open to the lower compartment 47. The lower duct 78 and sides 87 enclose the lower duct 78 about the ventilation intake panel 62, creating the lower channel 85 between the ventilation intake panel 62 and the lower duct 78.

The lower duct 78 and lower channel 85 establish a directed pathway for providing airflow across the alternator 68. Air from the lower duct 78 reaches the inlet of the alternator 68 to cool the alternator 68. Air from the lower duct 78 may also provide cooling for the engine 66. The air pulled though the lower channel 85 is sufficient to maintain the alternator 68 at a proper operational temperature.

The above described generator system 30 functions to provide a reduced footprint, using less square footage through the implementation of the remote radiator system 80. The disclosed remote radiator system 80 and ventilation are housed within the upper compartment 45 to allow for a smaller footprint of the generator system 30.

Figure 7:
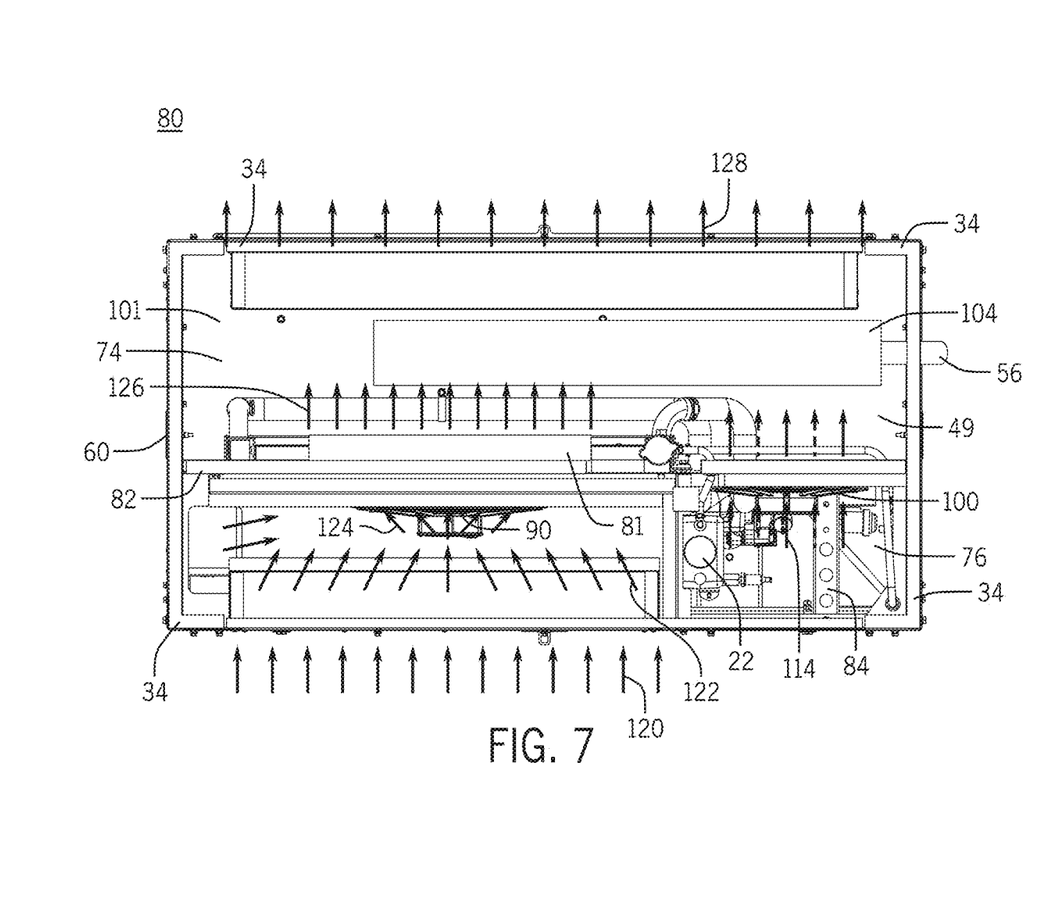
FIG. 7 illustrates a view from the top of the generator system as depicted in FIG. 3.

As illustrated in FIG. 7, the remote radiator system 80 operates to introduce air from outside the generator system 30 into remote radiator system 80 in the upper compartment 45. In operation, the radiator fan 90 is switched on and acts to pull air from outside in through the intake grate 59. Airflow 120 enters the remote radiator system 80 and continues over the blades of fan 90. Air 122 exits the radiator fan 90 and is moved through the radiator 81. The air 124 entering the remote radiator 81 acts to cool the cooling fluid of the remote radiator 81. Air moves out of the radiator 126 and into the exhaust compartment 101. Air that has entered the exhaust compartment 101 continues to flow toward the rear 46 of the generator system 30. In doing so, the air flows over the muffler 104. The air flow over the muffler works to cool the muffler and reduce the surface temperature of the muffler as well as the exhaust compartment 101. The air 128 exits the generator system 30 through an exhaust grate formed in the exhaust panel 64.

Figure 8:
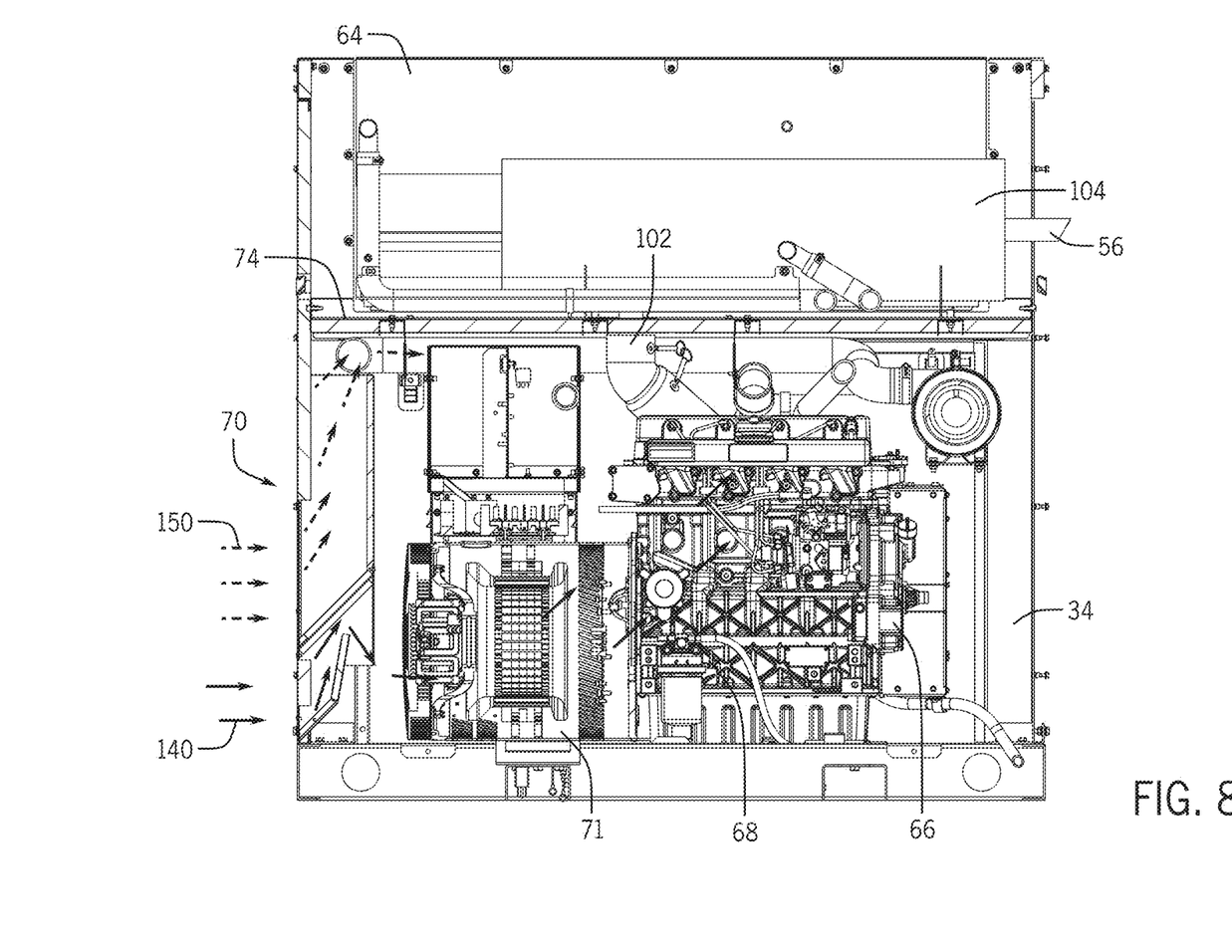
FIG. 8 illustrates a view from the back of the generator system as depicted in FIG. 6, including air flow directions.

As illustrated in FIG. 8, the disclosed generator system 30 also includes ventilation and combustion airflow for the engine and alternator within the lower compartment 47.

The lower compartment 47 ventilation functions to cool the alternator 68 and engine 66 by drawing air into the lower compartment 47 through the upper air intake 63 and lower air intake 69. Air 140 enters the lower duct 78 and flows through the lower channel 85. Air is drawn into the lower channel 85 initially by the alternator fan 71. The alternator fan 71 causes the air to flow over the alternator to cool the alternator. At the same time, the exhaust fan 100 in the upper compartment 45 is assisting the alternator fan 71 in drawing air in the lower compartment 47. Accordingly, the exhaust fan 100 should be sized to accommodate the load associated with the lower duct 78 and upper duct 77 as described below. Air that has been drawn into the bottom of the lower compartment 47 by the alternator fan 71 is pulled towards the exhaust fan 100. Air that flows over the alternator 66 also flows over the engine 66 as the exhaust fan 100 rotates, pulling the air towards the exhaust fan 100.

Also illustrated in FIG. 8, the rotation of the exhaust fan 100 also draws air 150 from the outside and into the lower compartment 47 through the upper air intake 63. Air drawn through the upper air intake 63 travels into the upper duct and through the upper channel 83. Air 150 pulled through the upper duct 77 travels towards the exhaust fan. As the air travels towards the exhaust fan it flows over the engine 66 and other components in the lower compartment to cool them. Air 150 provides cooling for the entire lower compartment 47. Combustible air is also provided to the engine air intake 72 by this air flow from air 150.

Figure 9:
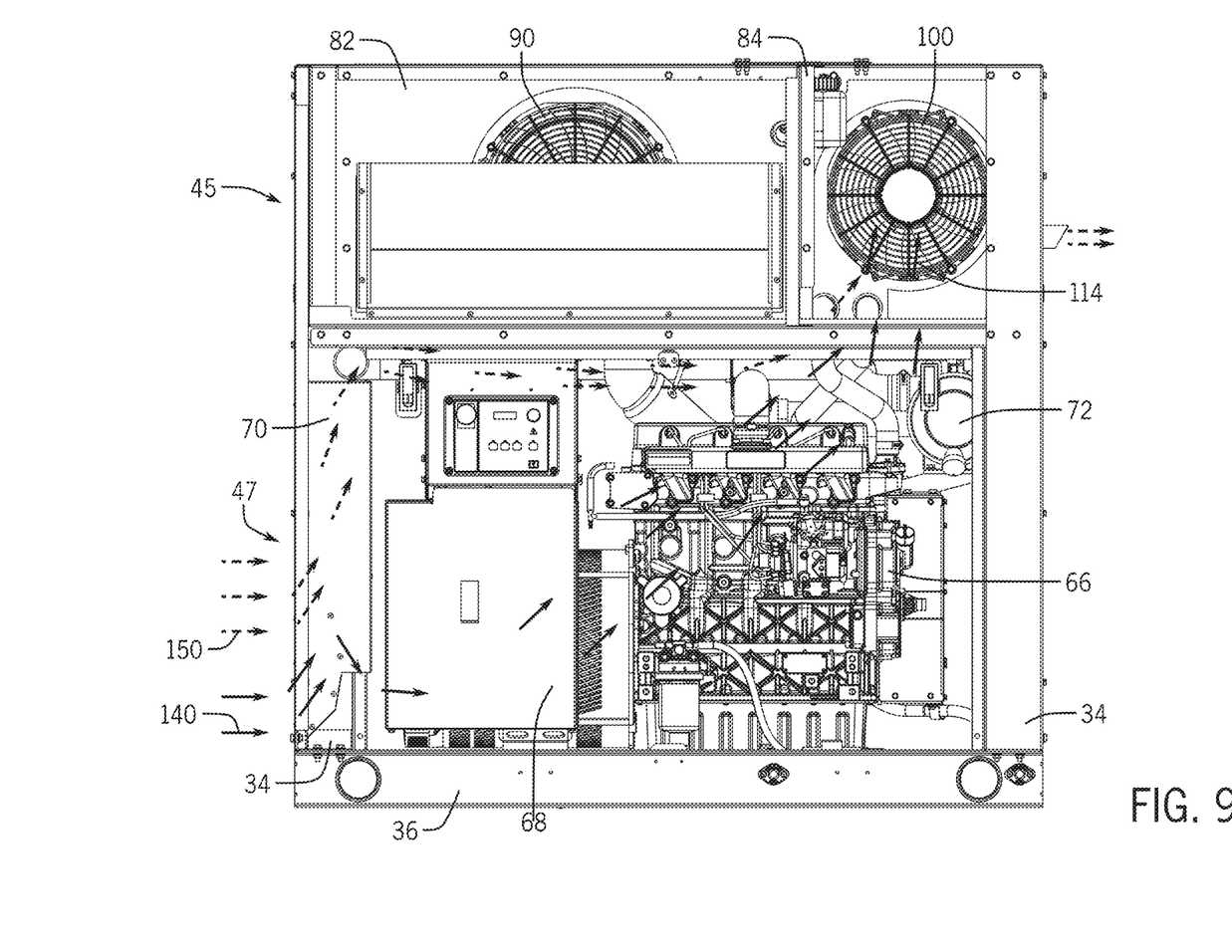
FIG. 9 illustrates an additional view from the back of the generator system as depicted in FIG. 6, further indicating air flow direction.

As illustrated in FIG. 9, air 140 and 150 mix and are pulled towards the exhaust duct cavity 92 by the exhaust fan 100. Air 114 $d$ from the lower compartment 47 is pulled into the exhaust duct cavity 92 by the exhaust fan 100. Air that in the exhaust cavity 92 is pulled through the exhaust fan 100 and pushed into the exhaust compartment 101. Air that enter the exhaust compartment 101 from the lower compartment 47 joins the air 126 exiting the remote radiator system 80. The combined air flows over the muffler 104. The air exits the generator system 30 through an exhaust grate 67 formed in the exhaust panel 64.

The above described generator system 30 additionally functions to reduce or eliminate the infiltration of rain water into the lower compartment 47. As outlined by safety standards, water may not be permitted to enter the AC voltage area, i.e. the lower compartment 47 of the generator system 30. The separation of the upper compartment 45 which may include rain water ingress from the upper compartment 45 prevents water from entering the lower compartment 47.

As described above, the channeling panel 74 creates a water barrier between the upper compartment 45 and the lower compartment 47. The barrier prevents rain water existing in the upper compartment 45 from entering the lower compartment 47. As rain water may enter through the radiator intake 58 or the exhaust grate 67, the water is directed via the slope of the channeling panel 74 to the rear 46 of the generator system 30 and out holes in the generator system 30. Water directed to the rear 46 may be directed out of the generator system 30. Directing water out of the generator system 30 prevents water from entering the lower compartment 47.

As referred to above, the above described generator system 30 reduces the footprint of the generator system by placing the radiator system 80 on top of the alternator 68 and engine 66. A reduced footprint configuration is particularly well suited for telecom usage where space is at a premium. In use, the generator system 30 may be placed adjacent a telecom structure in order to provide power to the telecom system, i.e. a cellular tower. A telecom structure may be secured to a concrete pad or placed on a metal structure. The reduced footprint results in a reduced use of square footage adjacent the telecom structure that is needed.

Figure 10:
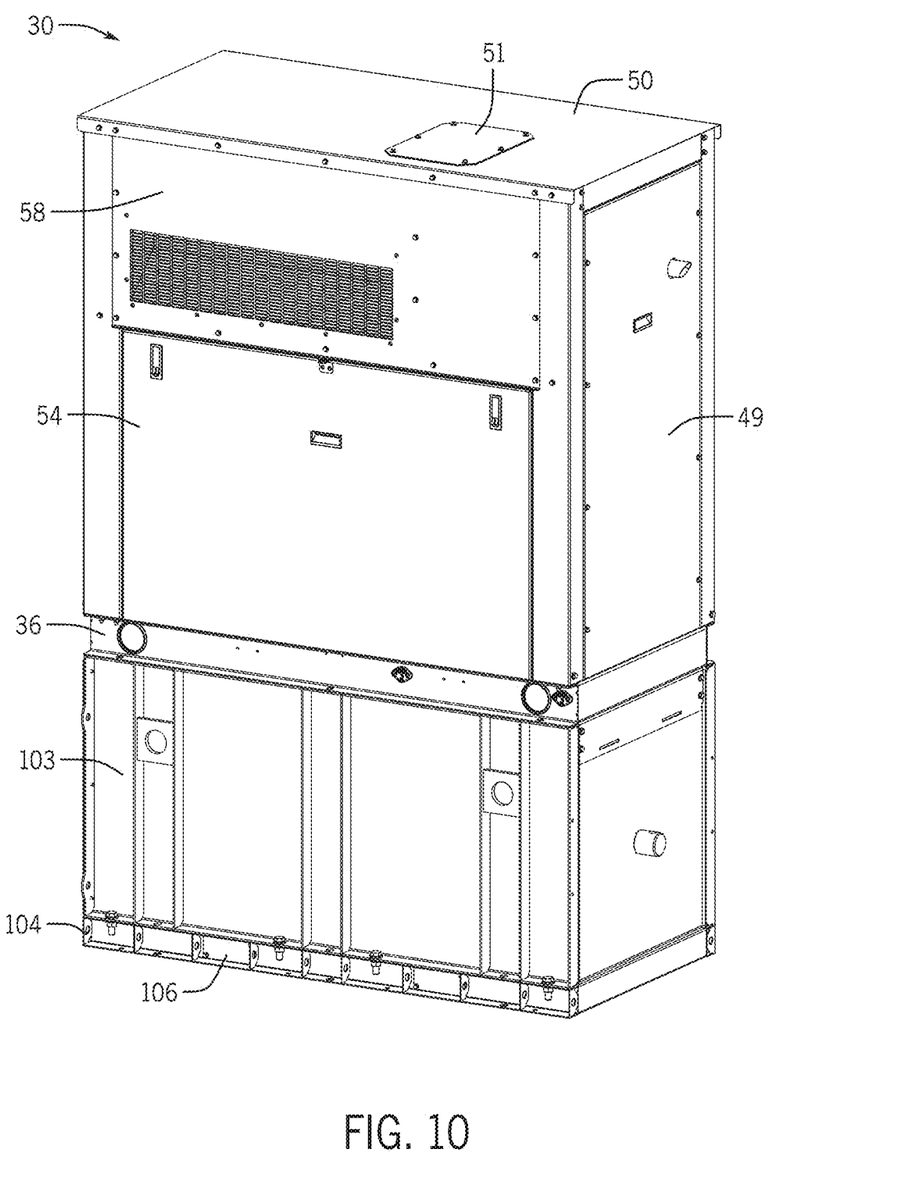
FIG. 10 illustrates the generator system and an attached fuel tank.

FIG. 10 illustrates the generator system 30 as depicted in FIG. 1 and including a fuel tank 103. The generator system 30 sits on top of the fuel tank 103. The fuel tank 103 supplies fuel for the engine 66 of the generator system 30. The fuel tank 103 is substantially the same size as the footprint of the generator system 30. Utilizing the fuel tank 103 with the same or similar footprint of the generator system 30 ensures that no more area is needed to install and utilize the generator system 30. Below the fuel tank 103 may be a fuel tank base 105 configured to support the fuel tank 103. The fuel tank base 105 may have the same dimensions or footprint as the fuel tank 103. The footprint may be at least two dimensions (e.g., length and width). Substantially the same footprint may be within a predetermined portion of each other (e.g., the length of the fuel tank and the width of the fuel tank are each within a percentage such as 2% or 5% of the dimensions of the upper compartment 45 and the lower compartment 47. The fuel tank base 105 may include one or more slots 106 for lifting the fuel tank 103 or the entire generator structure including the fuel tank 103 and the generator system 30. The slots 106 may be rectangular or shaped for mating with a forklift.

Figure 11:
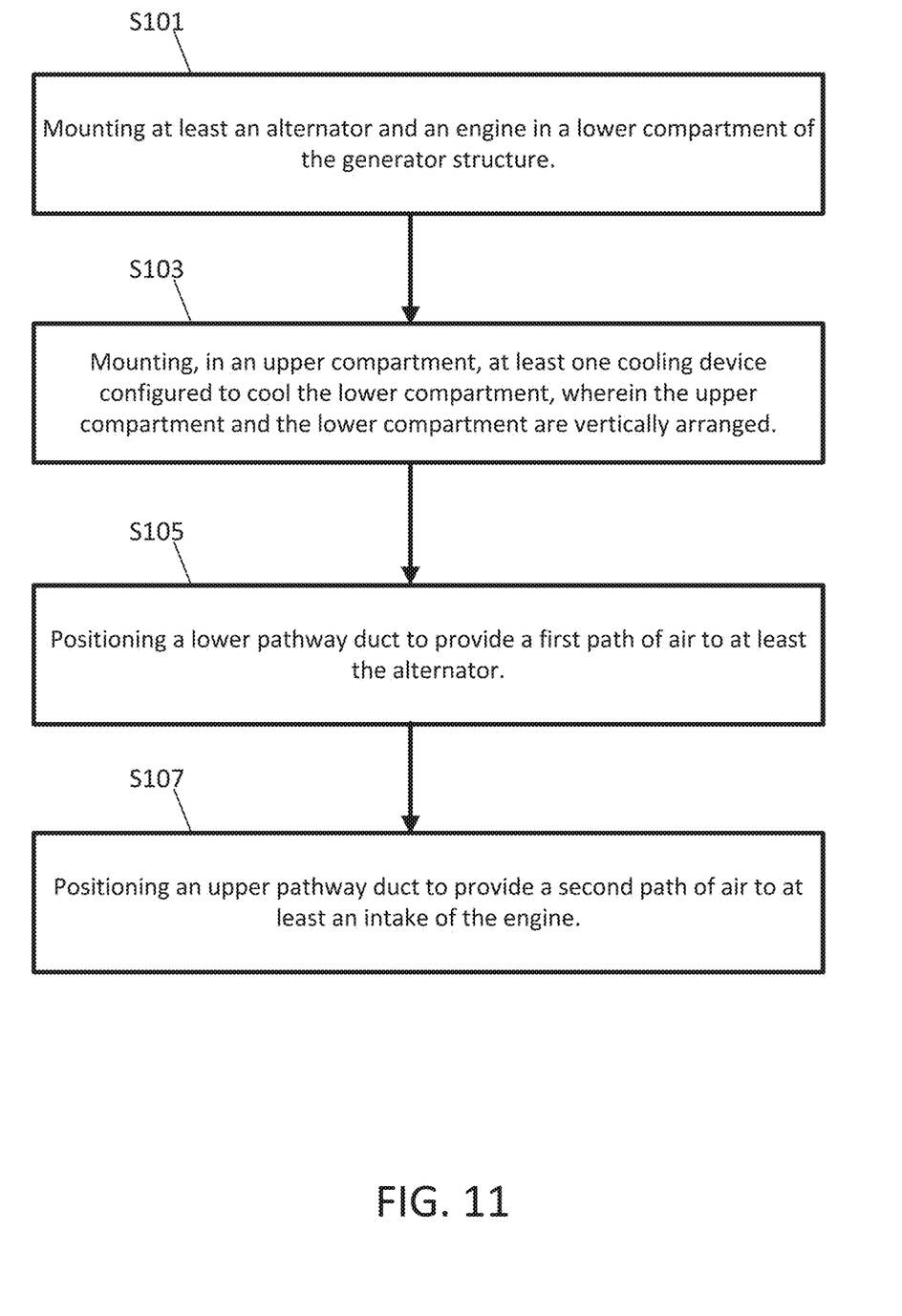
FIG. 11 illustrates a flow chart for manufacturing the generator system.

FIG. 11 illustrates an example method for manufacturing the generator structure of FIGS. 1-10. Additional, different, or fewer acts may be included.

At act S101, at least an alternator 68 and an engine 66 in a lower compartment of the generator structure. The alternator 68 and the engine 66 may be secured to a skid 36. The alternator 68 and the engine 66 may be mounted to the skid using one or more mounting brackets and connectors such as bolts with rubber isolators. The skid may include holes at mounting locations defined according to the size or model of the generator. The bolts with rubber isolates may be screwed into the skid and the generator to physically connect the skid and the generator but allow some relative movement. The amount of relative movement may be defined by the dimensions and/or material of the rubber isolators. The skid may be configured for transportation on a vehicle or rails.

At act S103, at least one cooling device configured to cool the lower compartment is mounted in the upper compartment using one or more mounting brackets and connectors such as bolts with rubber isolators. The rubber isolators cushion the connection between the at least one cooling device and the lower compartment and allow small amounts of movement between the at least one cooling device and the lower compartment. The cooling device may include a radiator, one or more fins, and/or a heat exchanger. The cooling device may be connected to one or more pipes that traverse a divider between the lower compartment and the upper compartments. The one or more pipes may care cooling flue, water, or air.

At act S105, a lower pathway duct is positioned to provide a first path of air to at least the alternator. At act S107, an upper pathway duct is positioned to provide a second path of air to at least an intake of the engine 66. The first path may be positioned above the second path. The first path may be at a first angle with respect to the horizontal plane (e.g., the plane of a bottom plane of the lower compartment or the skid), at the second path may be at a second angle with respect to the horizontal plane. The ducts may be positioned by securing the ducts to the lower compartment such as an end rail or bottom plate and adjusting the ducts to the first angle and second angle, respectively. The first angle and/or the second angle may be selected according to an amount of air flow or a proportion of the air flow that should be provided to cool the engine 66 and the alternator 68, respectively. The proportion of air may depend on the speed of the engine 66 or the load on the generator 68. The proportion of air may depend on the size or model of the engine 66 or the generator 68.

The method for manufacturing the generator structure may include mounting a radiator system above the upper compartment. The mounting technique may include aligning one or more mounting holes of the radiator system with the upper compartment for mounting with connectors. The radiator system provides a third path of air independent of the first path of air and the second path of air.

The method for manufacturing the generator structure may include mounting a fuel tank below the lower compartment. The lower compartment may connect to the fuel tank using a snap fit mechanism. The engine 66 may be connected to a fuel inlet that connects to the fuel tank. The fuel inlet may be connected to a combustion chamber of the engine 66.

The method for manufacturing the generator structure may include providing a plenum between the lower compartment and the upper compartment. The plenum may connect on a first side to the lower compartment and on a second side to the upper compartment. The plenum includes a first sealed opening for exhaust of the engine 66 and a second sealed opening for a cooling fluid that flows to the radiator system.

The electronic controls 23 may include a processor, a memory, and a communication interface. The processor is configured to perform instructions stored in memory for executing the algorithms described herein. The processor may identify an engine type, make, or model, and may look up system characteristics, settings, or profiles based on the identified engine type, make, or model for determining generator commands for operating the engine 66 or alternator 68. The processor may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as associated with a network, distributed processing, or cloud computing. The memory may be a volatile memory or a non-volatile memory. The memory may include one or more of a read only memory (ROM), random access memory (RAM), a flash memory, an electronic erasable program read only memory (EEPROM), or other type of memory. The memory may be removable from the network device, such as a secure digital (SD) memory card. The communication interface may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols. While the computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method of manufacturing a generator structure, the method comprising:
    mounting at least an alternator and an engine in a lower compartment of the generator structure;
    mounting, in an upper compartment, at least one cooling device configured to cool the lower compartment, wherein the upper compartment and the lower compartment are vertically arranged;
    positioning a lower pathway duct to provide a first path of air to at least the alternator; and
    positioning an upper pathway duct to provide a second path of air to at least an intake of the engine,
    wherein the upper pathway duct and the lower pathway duct, at least in part, are in fluid communication with the upper compartment.

2. The method of claim 1, further comprising:
    mounting a radiator system above the upper compartment, wherein the radiator system provides a third path of air independent of the first path of air and the second path of air.

3. The method of claim 1, further comprising:
    mounting a fuel tank below the lower compartment.

4. The method of claim 1, further comprising:
    providing a plenum between the lower compartment and the upper compartment, wherein the plenum includes a first sealed opening for exhaust of the engine and a second sealed opening for a cooling fluid.

5. A method of manufacturing a generator structure, the method comprising:
    mounting at least a first device in a lower compartment of the generator structure;
    mounting, in an upper compartment, at least a second device, wherein the upper compartment and the lower compartment are vertically arranged;
    positioning a plurality of pathway ducts to provide a first path and a second path of air to at least the first device; and
    wherein each of the plurality of pathway ducts, at least in part, are in fluid communication with the upper compartment.

6. The method of claim 5, wherein at least the first device includes an alternator and an engine.

7. The method of claim 5, wherein at least the second device includes a cooling device.

8. The method of claim 5, further comprising:
    mounting a radiator system above the upper compartment, wherein the radiator system provides a third path of air independent of the first path of air and the second path of air.

9. The method of claim 5, further comprising:
mounting a fuel tank below the lower compartment.
10. The method of claim 5, further comprising:
providing a plenum between the lower compartment and the upper compartment, wherein the plenum includes a first sealed opening for exhaust of the engine and a second sealed opening for a cooling fluid.

\* \* \* \* \*